United States Patent [19]

Krikke et al.

[11] Patent Number: 4,922,521

[45] Date of Patent: May 1, 1990

[54] SYSTEM FOR PROVIDING SECURE TELECOMMUNICATION ACCESS TO A COMPUTER

[75] Inventors: Germen K. Krikke; Hendrik Teule, both of Hilversum, Netherlands

[73] Assignee: U.S. Philips Corporation, New York, N.Y.

[21] Appl. No.: 320,728

[22] Filed: Mar. 8, 1989

Related U.S. Application Data

[63] Continuation-in-part of Ser. No. 91,677, Aug. 31, 1987, abandoned.

[30] Foreign Application Priority Data

Sep. 5, 1986 [NL] Netherlands ............... 8602245

[51] Int. Cl.⁵ .................. H04M 1/66; H04M 11/00
[52] U.S. Cl. .................. 379/95; 379/94; 379/189; 379/211
[58] Field of Search ............ 379/95, 94, 196, 197, 379/198, 188, 211, 93, 189

[56] References Cited

U.S. PATENT DOCUMENTS

| | | | |
|---|---|---|---|
| 4,154,988 | 5/1979 | Fechalos et al. | 379/189 |
| 4,531,023 | 7/1985 | Levine | 379/95 |
| 4,785,408 | 11/1988 | Britton et al. | 364/513.5 |
| 4,815,031 | 3/1989 | Furukawa | 364/900 |

FOREIGN PATENT DOCUMENTS 3329571 3/1985 Fed. Rep. of Germany ........ 379/95

OTHER PUBLICATIONS

"Securing Dial-Up Networks", J. Holmes, *Telecommunications*, Mar. 1984, pp. 84 and 124.
"The AT&T Multi-Mode Voice Systems . . . ", S. D. Hester et al., *Proc. of the 1985 AVIOS Conf.*, Sep. 1985, 12 pages.
"New Customer-Defined Network Service", M. Berger et al., *Telephony*, Mar. 10, 1986, pp. 50, 52, 54, 58 and 60.

*Primary Examiner*—Thomas W. Brown
*Attorney, Agent, or Firm*—Algy Tamoshunas; Leroy Eason

[57] ABSTRACT

A telecommunication exchange which provides secure access by only authorized terminals to a computer connected to the exchange. The control processor in the central control unit of the exchange is programmed to provide a "call-back" procedure in respone to a request from a terminal for access to the computer. The calling terminal enters by tone or pulse dialing, the address (such as a telephone number) of the computer together with an identification code. The control processor compares such identification code with a list stored therein of authorized identification codes and authorized terminals addresses corresponding thereto. If the identification code is authorized, the control processor causes a confirm signal to be transmitted from the exchange to the requesting terminal signifying to the user of such terminal to release its line, after which a ringing signal is transmitted to the authorized terminal address corresponding to the authorized code. When such authorized terminal then engages its line, the control processor causes the switching network to establish connection of such terminal to the computer. Since the security procedure is provided by the control processor, there is no need for an external security unit and secure access to the computer can be maintained even if call-forwarding facilities are provided by the exchange.

5 Claims, 3 Drawing Sheets

SYSTEM FOR PROVIDING SECURE TELECOMMUNICATION ACCESS TO A COMPUTER

BACKGROUND OF THE INVENTION

1. Related Applications

This application is a continuation-in-part of Applicants' pending application Ser. No. 091,677 filed Aug. 31, 1987, now abandoned.

2. Field of the Invention

The invention relates to a system for providing secure telecommunication access to a computer connected thereto, the system comprising a telecommunication exchange, terminals connected to the exchange, and a switching network and central control unit in the exchange. The central control unit includes a control processor programmed to follow a security procedure for safeguarding access to the computer by a terminal requesting such access. The control processor includes a receive memory for receiving from a requesting terminal an identification code assigned to such terminal, and an authorization memory for storing the identification codes and corresponding addresses (such as telephone numbers) of terminals which are authorized to establish connection with the computer. The control processor is programmed to match a received identification code stored in the receive memory against the contents of authorized codes stored in the authorization memory, and actuates the switching network to transmit a ringing signal to the terminal address corresponding to such identification code if there is such a match. The control processor subsequently further actuates the switching network to establish a telecommunication line connection between the terminal 50 and the computer after such terminal engages the line in response responds to the ringing signal.

3. Description of the Related Art

A telecommunication system for providing secure access to a computer is described in the article entitled "Call Back Schemes Ward Off Unwanted Access By Telephone", Electronics, Mar. 8, 1984, pp. 131-135. Such system comprises a telecommunication exchange and a separate security unit connected to the telecommunication line just before the access ports of the computer.

It is possible for a data terminal to be connected to a computer, even though the distance between the computer and the terminal may be large. This connection can be achieved via a telecommunication network (public or private), and a plurality of terminals can be connected to the computer via a telecommunication exchange comprised in such telecommunication network.

A problem which may arise, however, is that unauthorized users may try to gain access to the computer. A known security system is known under the name of "call-back system". When implementing this system a person who wants to start using the computer dials a telephone number to an access port of the computer. Subsequently, this person provides the access port with an identification code, which the computer compares with the identification codes stored in its memory. If it appears that the provided identification code matches a stored identification code, the computer will select a telephone number which inside the computer memory is linked with the stored identification code. This will generally be the telephone number of the person who wants to start using the computer, thus of the requesting terminal, and the computer calls back such telephone number to establish connection to such terminal.

From the aforesaid publication it is known to insert between the exchange and the computer a separate security unit for performing the access port function by means of the call-back scheme. When implementing this scheme the user dials the telephone number of the subscriber line connected to the security unit, upon which a normal telephone connection between the user and the security unit is established. Then the identification code is transferred via the thus formed communication channel to the security unit which establishes through-connection to the computer.

Such known system has two disadvantages. A first disadvantage is that signaling information available in the exchange is not readily available in the security unit; consequently, this signaling information cannot be used to advantage for controlling access to the computer. A second disadvantage is that the known system requires a separate security unit, the complexity and price of which increases with an increasing number of users and computer ports.

SUMMARY OF THE INVENTION

The object of the invention is to provide a telecommunication system providing secure access to a computer, and wherein besides the usual network elements such as the exchange, terminals, and a computer, no additional equipment is required; security access control being achieved by utilizing the signaling information already available in the exchange.

To this end, a system in accordance with the invention is characterized in that the function of the security unit is performed by the control processor in the central control unit comprised in the exchange, such processor being programmed so that the security procedure must be completed before connection is established between a terminal and a telephone line giving such terminal access to the computer.

As the security function is performed within the exchange, safeguarding access to the computer can be provided in a modern electronic telecommunication exchange as a software program in the control processor. Thereby the control processor and the memory capacity already available in the exchange can be used to advantage, which is far less expensive than separate security equipment. The aforesaid security procedure prevents unauthorized callers who happen to learn of the subscriber number of one of the subscriber lines to the computer from dodging the access control by simply dialing the number of such line.

A further advantage of the system in accordance with the invention is that signaling information already available in the exchange is used for access control therein. Consequently, terminals connected to the exchange can employ either pulse dialing or tone dialing. In either case, access to the computer can be achieved by means of a code to be entered by the user. This is in contrast with the known system wherein the separate security unit can only receive tone dialing signals.

Modern electronic exchanges can offer the associated users rerouting facilities known as "follow-me", "call-forwarding" or "chief-secretary facilities". The user of a terminal (the original destination terminal) can then make known to the exchange that calls meant for him should be transferred to another terminal (the divert terminal). The exchange control processor reroutes a call intended for an original destination terminal to a divert terminal connected to the exchange.

To avoid calls processed by the exchange from being diverted to a non-authorized terminal, an exchange in accordance with the invention is characterized in that the control processor controls the switching network in the exchange to switch through the connection between the computer and the original destination terminal under the control of the security procedure irrespective of the selective rerouting.

With these measures and by combining signaling information indicating rerouting with the security information, it is avoided that a non-authorized terminal can gain access to the computer by the "call-back" method. This ability is not possible when a separate security unit is used for controlling connection to the computer.

An advantageous embodiment of the invention is characterized in that the identification code of a terminal forms part of the telephone number for requesting connection to the computer, and must be dialed by the user of the requesting terminal.

The aforesaid measures simplify requesting a connection to the computer. If such a facility with a separate security unit were to be inserted between the exchange and the computer, as many subscriber lines would be required between the exchange and the security unit as the number of authorized identification codes.

Besides the aforedescribed rerouting and inserting the identification code in the computer request number, the use of the information already available in the exchange offers still further possibilities. A first possibility is identification of the terminal by means of which an unauthorized person tries to gain access to the computer. This is particularly important in private exchanges if the terminal is connected to that exchange. A second possibility is using the so called "repeated call-back" facility, enabling repeated calling-back of the authorized terminal if it appears to be busy at a first calling-back.

BRIEF DESCRIPTION OF THE DRAWINGS

A more complete description of a system in accordance with the invention and its advantages is set forth below with reference to the accompanying Figures, in which.

DESCRIPTION OF THE PREFERRED EMBODIMENTS

Figure 2:
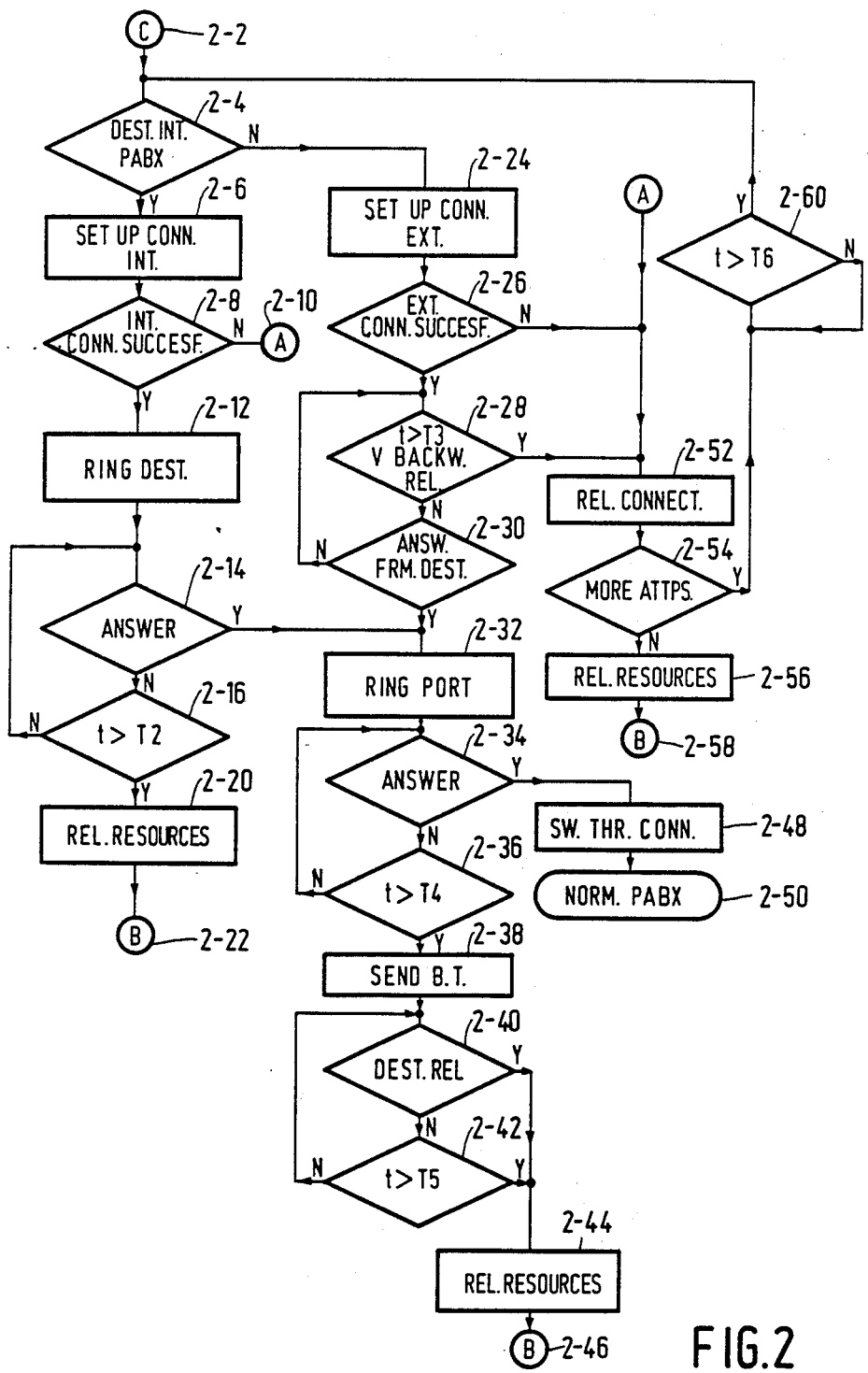
FIG. 2 is a flow-chart o the call-back part of such procedure.
Figure 3:
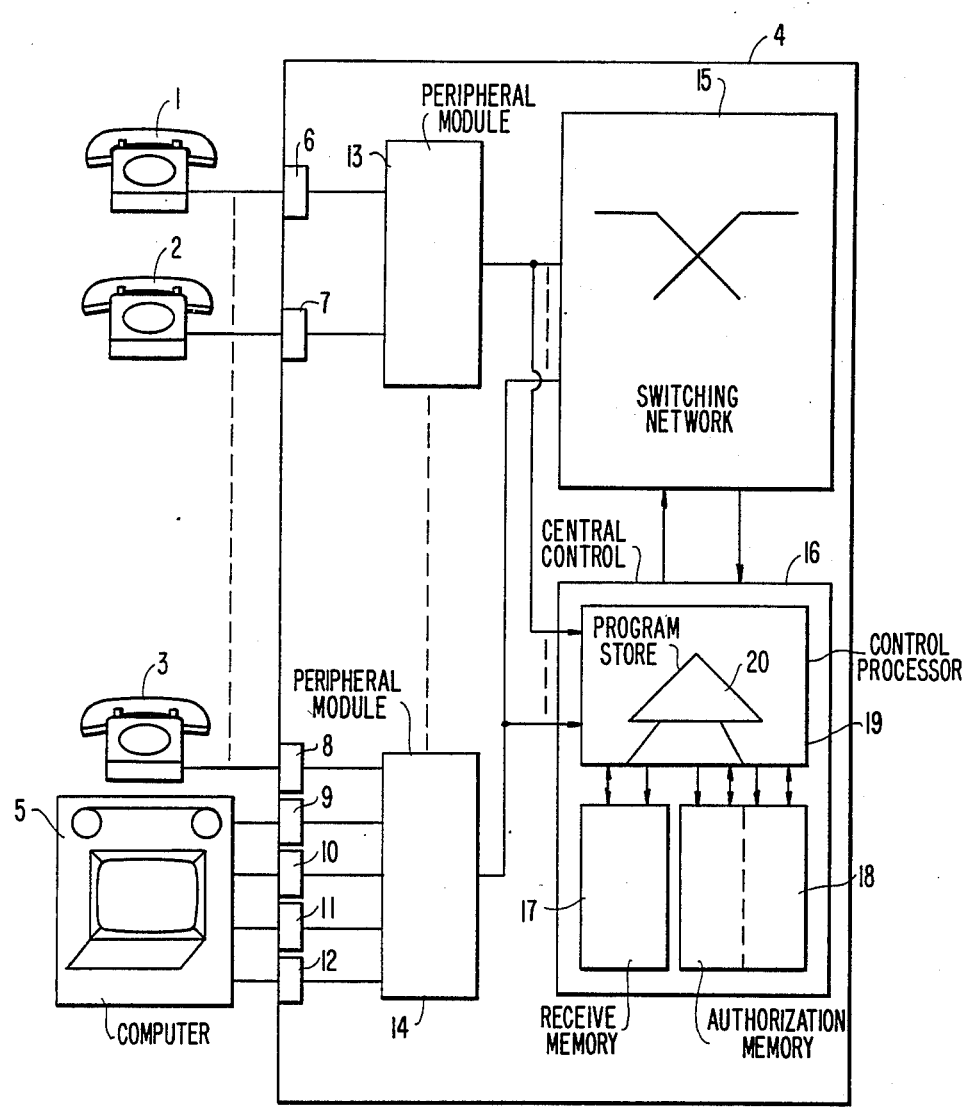
FIG. 3 is a block diagram of a telephone exchange wherein the control processor in the central control unit of such exchange is programmed in accordance with the above flow-charts.

The block diagram in FIG. 3 shows a telephone exchange in accordance with the invention. A plurality of terminals 1, 2, 3 are connected to the exchange 4. An external computer 5 is also connected to exchange 4. Each terminal is connected to a line circuit 6, 7, 8 in the exchange, which line circuits generate ringing current to the terminal connected thereto under the control of an activating signal. The external computer 5 is connected by a plurality of connecting lines to a plurality of line circuits 9, 10, 11, 12 which constitute the computer ports. The plurality of line circuits is divided into subsets respectively connected to peripheral modules 13, 14 in the exchange and which are connected to a switching network 15 and a central control unit 16. The central control unit 16 contains a receive memory 17 for storing the identification code received from a requesting terminal, an authorization memory 18 for storing a list of authorized identification codes and the telephone numbers of terminals having such codes, and a control processor 19. The control processor 19 executes all control tasks as described hereinafter with reference to FIGS. 1 and 2, in accordance with a program stored in a program store 20 therein.

Figure 1:
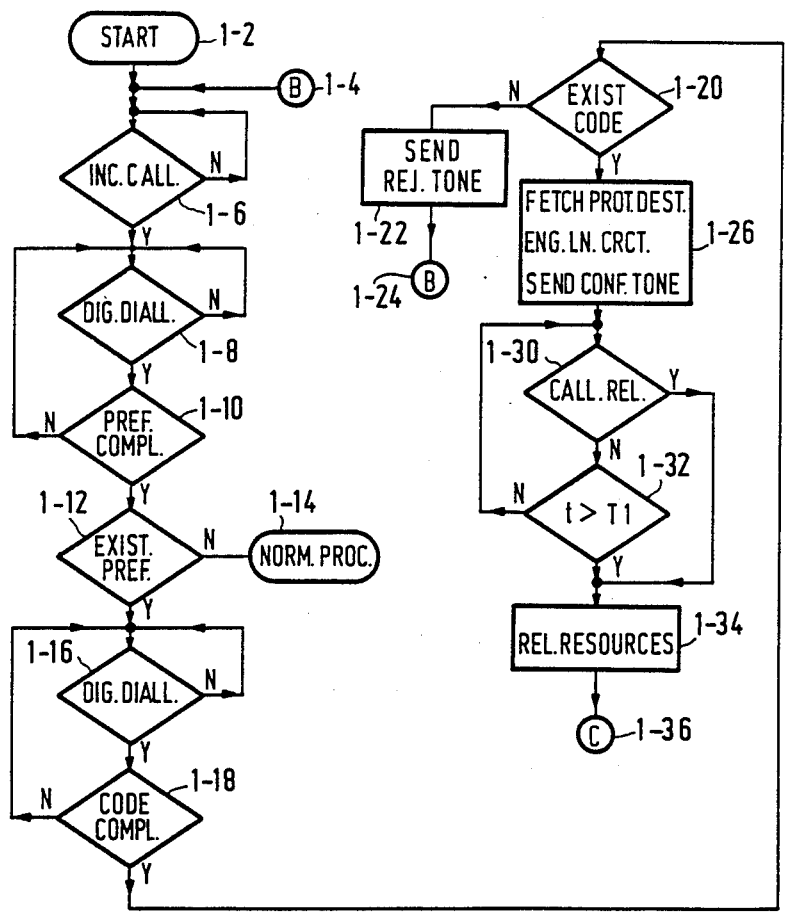
FIG. 1 is a flow-chart of the request part of the "call-back" procedure in accordance with the invention.

The request part of the call-back procedure is shown in the flow-chart FIG. 1, the blocks therein having the following meanings:

| Block Number | Title | Meaning |
| --- | --- | --- |
| 1-2 | START | begin of the call-back procedure |
| 1-4 | B | junction point with all further blocks marked "B" |
| 1-6 | INC.CALL | check whether a call is made over an exchange subscriber line or over a line connecting the exchange to another exchange; |
| 1-8 | DIG.DIALL | check whether the caller dials a digit; |
| 1-10 | PREF.COMPL. | check whether the first part of the number to be dialled (the prefix) is complete; |
| 1-12 | EXIST.PREF. | check whether the digit combination forming the prefix is a prefix indicating that the caller wishes to gain access to the computer; |
| 1-14 | NORM.PROC. | the exchange follows the normal procedure for calls which are not intended for the computer; |
| 1-16 | DIG.DIALL. | check whether the caller dials a further digit; |
| 1-18 | CODE COMPL. | check whether the second part of the number to be dialled (the identification code) is complete; |
| 1-20 | EXIST.CODE | check whether the received code is a code existing in the authorization memory; |
| 1-22 | SEND REJ. TONE | if the code is not authorized, send a reject tone to the caller |
| 1-24 | B | junction point with all other blocks marked "B"; |
| 1-26 | FETCH PROT. DEST. ENG.LN.CRCT SEND CONF. TONE | the telephone number of the terminal having the authorized identification code is being fetched; the line circuit of a subscriber line connected to the computer is engaged and a confirm tone is transmitted to inform the caller to release the line connection; |
| 1-30 | CALL.REL. | check whether the caller has released the line connection; |
| 1-32 | t > T1 | check whether a time T1 has passed after the start of a confirm tone; |
| 1-34 | REL. RESOURCES | all units used for handling the request for a computer connection are released, but the engaged line circuit to the computer remains engaged; |
| 1-36 | C | junction point with all further blocks marked "C" |

The request part of the "call-back" procedure starts with a check whether there is an incoming call (block 1-6). It is assumed that the number transmitted by the user to the exchange consists of two parts: a prefix indicating that the user wishes to gain access to the computer and an identification code in combination with the prefix indicating with which authorized terminal the connection is desired.

After the relevant digits are received it is checked whether it is a prefix for computer access (blocks 1–8, 1–10, 1–12). If this is not the case the normal standard procedure is followed for handling a call (1–14). If it is a prefix for computer access, the subsequent identification code (1–16, 1–18, 1–20) is checked.

If the received identification code does not match one of the stored identification codes, the request is not processed any further by the exchange; this can be made known to the sender by means of a reject signal (1–22). If the identification code is valid the exchange sends a confirm signal to the sender signifying that the line connection should be released. The telephone number of the sending terminal corresponding to the valid code will likewise be fetched and the line circuit of the desired computer port will be reserved for connection to such terminal (1–26).

After the connection to the sender has been released, either by the sender himself (1–30) or after a clock interval T1 in the exchange (1–32), all units associated with the exchange (hardware and software) which were used in the aforesaid procedure are released again. Only the already engaged line circuit to the computer remains in the engaged state.

Subsequently, the call-back part of the "call-back" procedure is executed.

In FIG. 2 is shown a flow-chart representing this procedure. The blocks in this Figure have the following meanings:

| Block Number | Title | Meaning |
|---|---|---|
| 2-2 | C | junction point with all further blocks marked "C"; |
| 2-4 | DEST.INT. PABX | check whether the authorized terminal is connected direct to the exchange; |
| 2-6 | SET UP CONN.INT. | attempt to set up an internal connection between the authorized terminal and the already engaged line circuit to the computer disregarding any call-rerouting for that terminal; |
| 2-8 | INT.CONN. SUCCESF. | check whether the internal connection is set up successfully; |
| 2-10 | A | junction point with all further blocks marked "A"; |
| 2-12 | RING DEST. | send a ringing signal to the authorized terminal; |
| 2-14 | ANSWER | check whether the authorized terminal answers the call (i.e., engages its line); |
| 2-16 | t > T2 | check whether a time T2 has passed after the start of the ringing signal to the authorized terminal; |
| 2-20 | REL. RESOURCES | all units that were used for calling the internal authorized terminal are released; |
| 2-22 | B | junction point with all further blocks marked "B"; |
| 2-24 | SET UP CONN.EXT | attempt to set up a connection between the (external) authorized terminal and the already engaged line circuit; |
| 2-26 | EXT.CONN. SUCCESF. | check whether the external connection has been set up successfully; |
| 2-28 | t > T3 V BACKW.REL | check whether a time T3 has passed after the external connection has been set up successfully or whether the connection was released during calling; |
| 2-30 | ANSW.FRM. DEST. | check whether the authorized terminal answers the call (i.e., engages its line); |
| 2-32 | RING PORT | the computer port is called by means of a ringing signal; |
| 2-34 | ANSWER | check whether the computer port answers the call; |
| 2-36 | t > T4 | check whether a time T4 has passed after the start of the ringing signal to the computer port; |
| 2-38 | SEND B.T. | a busy tone is sent to the authorized terminal; |
| 2-40 | DEST.REL. | check whether the authorized terminal has released its line connection; |
| 2-42 | t > T5 | check whether a time T5 has passed after the start of the busy tone to the authorized terminal; |
| 2-44 | REL. RESOURCES | all units that were used for setting up a connection between the computer port and the external authorized terminal are released; |
| 2-46 | B | junction point with all further blocks marked "B"; |
| 2-48 | SW.THR.CONN. | a communication channel is established between the computer port and the external authorized terminal; |
| 2-50 | NORM.PABX. | the exchange starts following the normal procedure for further handling an existing communication channel; |
| 2-52 | REL.CONNECT. | all exchange units that were used to set up the connection are released, except for the already engaged line circuit of the computer; |
| 2-54 | MORE ATTPS. | check whether a new attempt should be made to set up a connection; |
| 2-56 | REL. RESOURCES | all exchange units that were used to set up the connection are released; |
| 2-58 | B | junction point with all further blocks marked "B"; |
| 2-60 | T > T6 | check whether a time exceeding T6 has passed since the units that were used to set up the connection were released. |

What is claimed is:

1. A telecommunication exchange for controlling the interconnection of an external computer connected thereto to any of a plurality of terminals also connected thereto over telephone lines, interconnection of the computer with a terminal requesting access thereto only being established if such terminals transmits an authorized identification code and has an address in accordance with a predetermined list of authorized identification codes and authorized terminal addresses corresponding thereto; such exchange comprising:

a control processor which includes a receive memory for storing the identification code transmitted by a requesting terminal and an authorization memory for storing said list of authorized identification codes and authorized terminal addresses corresponding thereto;

said control processor being programmed to compare whether the identification code received from a requesting terminal and stored in the receive memory matches an authorized identification code stored in the authorization memory, and if there is such a match to identify the authorized terminal address corresponding to such authorized identification code;

a switching network controlled by said control processor to selectively interconnect any of the terminals connected to said exchange with said computer and to selectively transmit confirm signals and ringing signals to any of such terminals, a confirm signal signifying to a user of a terminal to release its line and a ringing signal signifying to a user of a terminal to engage its line;

said control processor being further programmed to carry out a security procedure such that upon determining that a requesting terminal has an authorized identification code said control processor causes said switching network to
   (i) transmit a conform signal to the requesting terminal,
   (ii) after the calling terminal line has been released, transmit a ringing signal to the authorized terminal address corresponding to said authorized identification code, and
   (iii) after the terminal at the authorized address has engaged its line, interconnect such terminal with said computer.

2. A telecommunication exchange as claimed in claim 1 wherein said control processor includes a program memory for storing a program which controls the operation thereof in accordance with said security procedure, and said authorization memory is included in said program memory.

3. A telecommunication exchange as claimed in claim 1, characterized in that the identification code of a terminal forms part of the address to be dialed by a user of such terminal when requesting access to said computer.

4. A telecommunication exchange as claimed in claim 1, wherein the exchange is adapted to reroute calls directed to an original destination terminal to a designed divert-terminal, and further characterized in that said control processor controls said switching network to provide interconnection of said computer with an original destination terminal in accordance with said security procedure irrespective of the applied rerouting of calls directed to such terminal other than calls for providing interconnection of such terminal with said computer.

5. A process for use in a telephone exchange for controlling the interconnection of an external computer connection thereto to any of a plurality of terminals also connected thereto over telephone lines, interconnection of the computer with a terminal requesting access thereto only being established if such terminal transmits an authorized identification code and has an authorized address in accordance with a predetermined list of authorized identification codes and authorized terminal addresses corresponding thereto; such process comprising:

receiving and storing in a receive memory in said exchange the identification code transmitted by a requesting terminal;

storing in an authorization memory in said exchange said list of authorized identification codes and authorized terminal addresses corresponding thereto;

comparing whether an identification code received from a requesting terminal and stored in the receive memory matches an authorization code stored in the authorization memory, and if there is such a match identifying the authorized terminal address corresponding to such authorized identification code; and controlling a switching network in said exchange to
   (i) transmit a confirm signal to the requesting terminal to signify to a user thereof to release its line,
   (ii) after the calling terminal line is released, transmit a ringing signal to the authorized terminal address corresponding to said authorized identification code to signify to a user of such authorization terminal to engage its line, and
   (iii) after said authorized terminal has engaged its line, interconnect such terminal with said computer.

* * * * *